United States Patent
Komiya et al.

(10) Patent No.: US 6,707,579 B1
(45) Date of Patent: Mar. 16, 2004

(54) IMAGE FORMATION APPARATUS HAVING UNIT FOR CORRECTING IRREGULARITIES IN DENSITY OF IMAGE DATA AFTER BINARIZATION

(75) Inventors: Yasuhiro Komiya, Hino (JP); Kenro Osawa, Hachioji (JP); Ken Ioka, Machioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/370,730

(22) Filed: Aug. 9, 1999

(30) Foreign Application Priority Data

Aug. 11, 1998 (JP) .......................................... 10-226973

(51) Int. Cl.[7] .............................................. G16K 15/00
(52) U.S. Cl. ......................... 358/3.1; 358/1.3; 358/1.8; 358/1.9; 358/7.99
(58) Field of Search ........................ 358/1.9, 1.3, 1.8, 358/2.99, 3.1, 3.21, 521

(56) References Cited

U.S. PATENT DOCUMENTS 5,847,721 A * 12/1998 Ogata ............................. 347/9
6,247,780 B1 * 6/2001 Matsubara ..................... 347/19

FOREIGN PATENT DOCUMENTS

| JP | 362053573 | * 3/1987 | ............ H04N/1/40 |
| JP | 404217172 | * 8/1992 | ............ H04N/1/40 |
| JP | 2748321 | 2/1998 | .......... H04N/1/407 |

* cited by examiner

Primary Examiner—Jerome Grant, II
(74) Attorney, Agent, or Firm—Frishauf, Holtz, Goodman & Chick, P.C.

(57) ABSTRACT

An image formation apparatus is equipped with a recording head having a plurality of recording elements for forming an image on a recording medium. A binarized image data storage unit stores binarized image data for on-off control of the recording elements of the recording head. A correction data storage unit stores density irregularity correction data for correcting irregularities in density which occur when the recording elements of the recording head are respectively driven to form the image for each of the recording elements. A density irregularity correction unit corrects, prior to the image formation, the binarized image data stored in the binarized image data storage unit on the basis of the density irregularity correction data stored in the correction data storage unit.

9 Claims, 14 Drawing Sheets

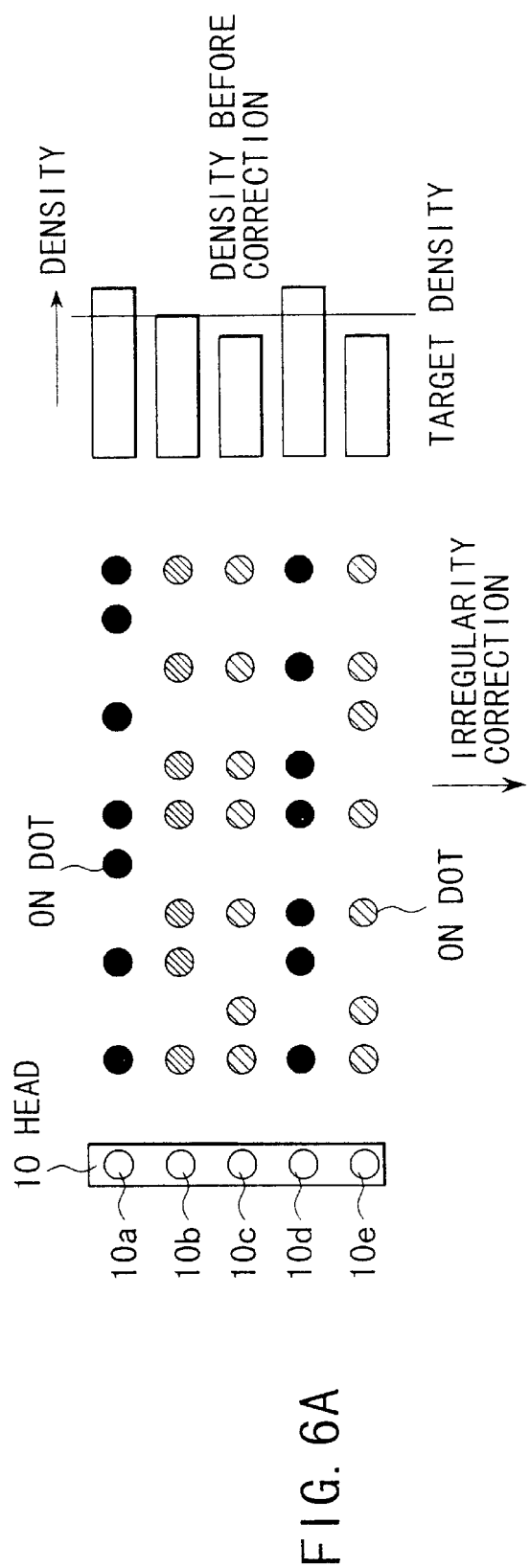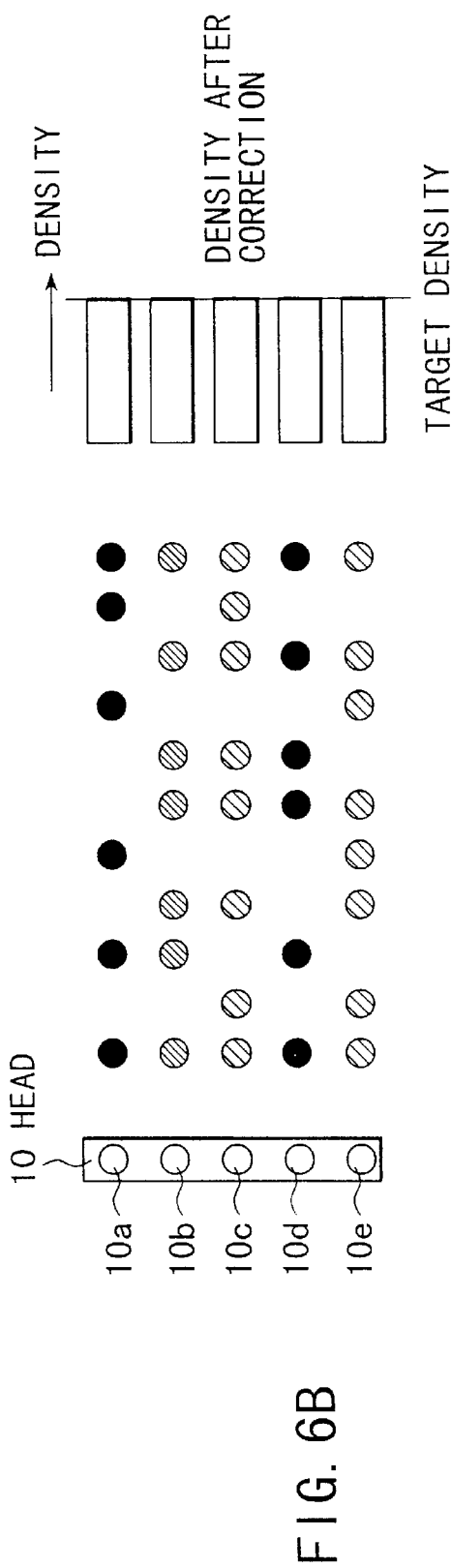
FIG. 6A
FIG. 6B

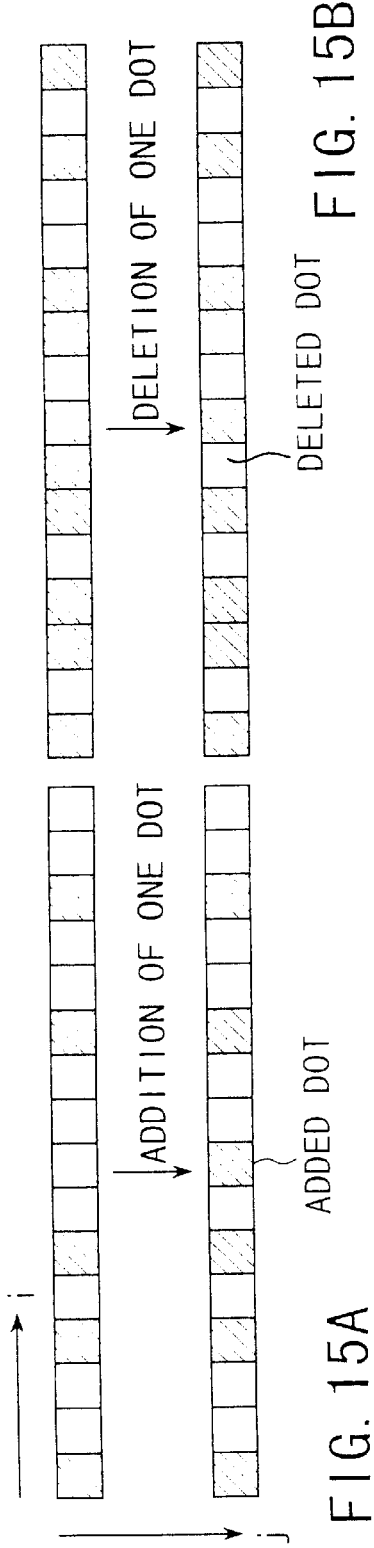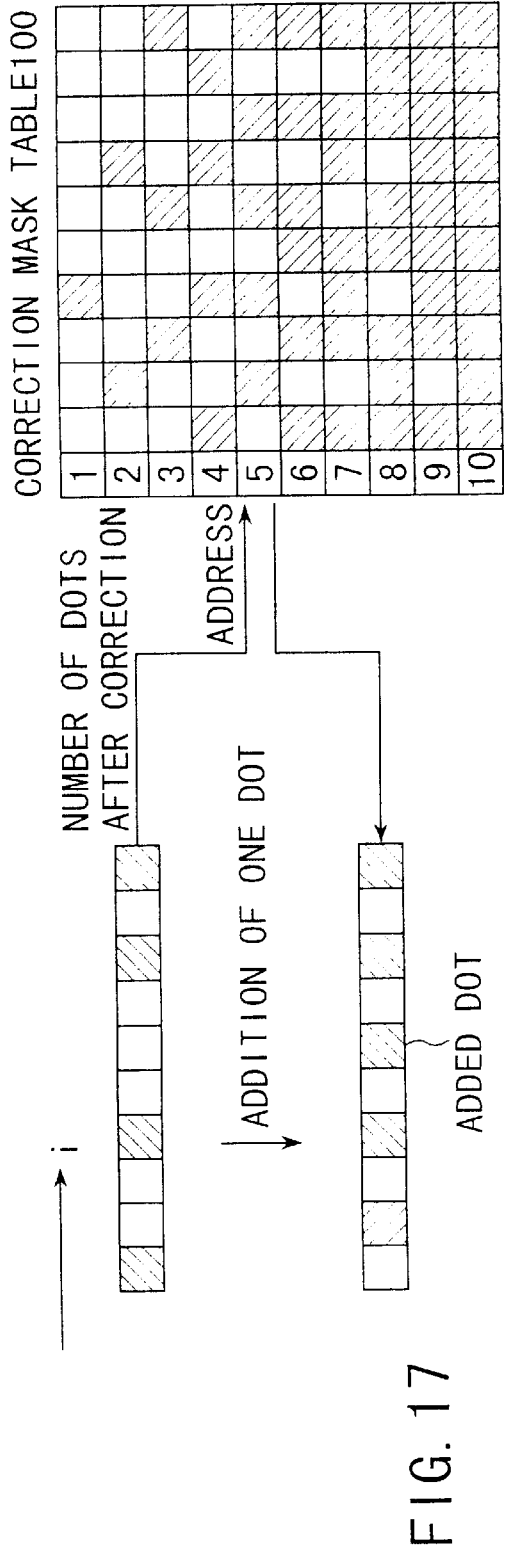

IMAGE FORMATION APPARATUS HAVING UNIT FOR CORRECTING IRREGULARITIES IN DENSITY OF IMAGE DATA AFTER BINARIZATION

BACKGROUND OF THE INVENTION

The present invention relates to an image formation apparatus.

With the progress in electronic video equipment, image formation has been performed using recording heads of ink jet or thermal transfer types. Particularly, in order to attain high-speed printing, the recording heads have been increased in size or have been formed from multiple heads.

However, with the ink jet-based image formation, there are variations in the amount or direction of ink ejected from nozzles of a recording head. The variations may apparently form irregularities in image density such as lines. The image irregularities remarkably appear in large recording heads and multi-head systems. Thus, irregularities in the line form are produced with a period corresponding to the width of the recording head, which constitutes a factor degrading considerably print quality. The variations also vary with time in the case of recording over a long period of time.

Japanese Patent No. 2748321 discloses a method of correcting such irregularities in density. In the image formation in which image data is converted into binarized image data and on-off control of each nozzle is performed in accordance with the binarized image data, this method uses an irregularity correction table provided ahead of the binarization unit, thereby correcting the multivalued image data. By correcting variations in the amount or direction of ejected ink from nozzle to nozzle with such a method, irregularities in image density can be corrected.

However, in order to make irregularity correction on input multivalued image data prior to the binarization, it is required to take into consideration how the input multivalued image data is converted into binarized image data. That is, the correction of irregularities in image density depends on the method of binarization. In addition, the expansion of density caused by binarization may result in a failure to correct irregularities in image density accurately. Moreover, the provision of the binarization unit on the outside of the image formation apparatus makes it impossible to make correction of irregularities in image density on the inside of the image formation apparatus, resulting in a failure in automated correction.

It is therefore an object of the present invention to provide an image formation apparatus which makes density irregularity correction for image data already subjected to binarization, thereby permitting precise density irregularity correction to be made automatically within the apparatus independently of binarization processing.

BRIEF SUMMARY OF THE INVENTION

To attain the object, an image formation apparatus of the present invention comprises: a recording head having a plurality of recording elements for recording an image on a recording medium; binarized image data storage unit for storing binarized image data for on-off control of the recording elements of the recording head; correction data storage unit for storing density irregularity correction data for correcting irregularities in density which occur when the recording elements of the recording head are respectively driven to form the image, the density irregularity correction data being stored in correspondence with each of the recording elements; and density irregularity correction unit for, prior to the image formation, correcting the binarized image data stored in the binarized image data storage unit on the basis of the density irregularity correction data stored in the correction data storage unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A and 6B are a conceptual diagram for use in explanation of density irregularity correction by changing the number of dots;

FIGS. 15A and 15B are diagrams for use in explanation of dot arrangement correction that allows for the arrangement of surrounding dots;

FIG. 17 is a diagram for use in explanation of a dot correction method using a correction mask table;

DETAILED DESCRIPTION OF THE INVENTION

Figure 1:
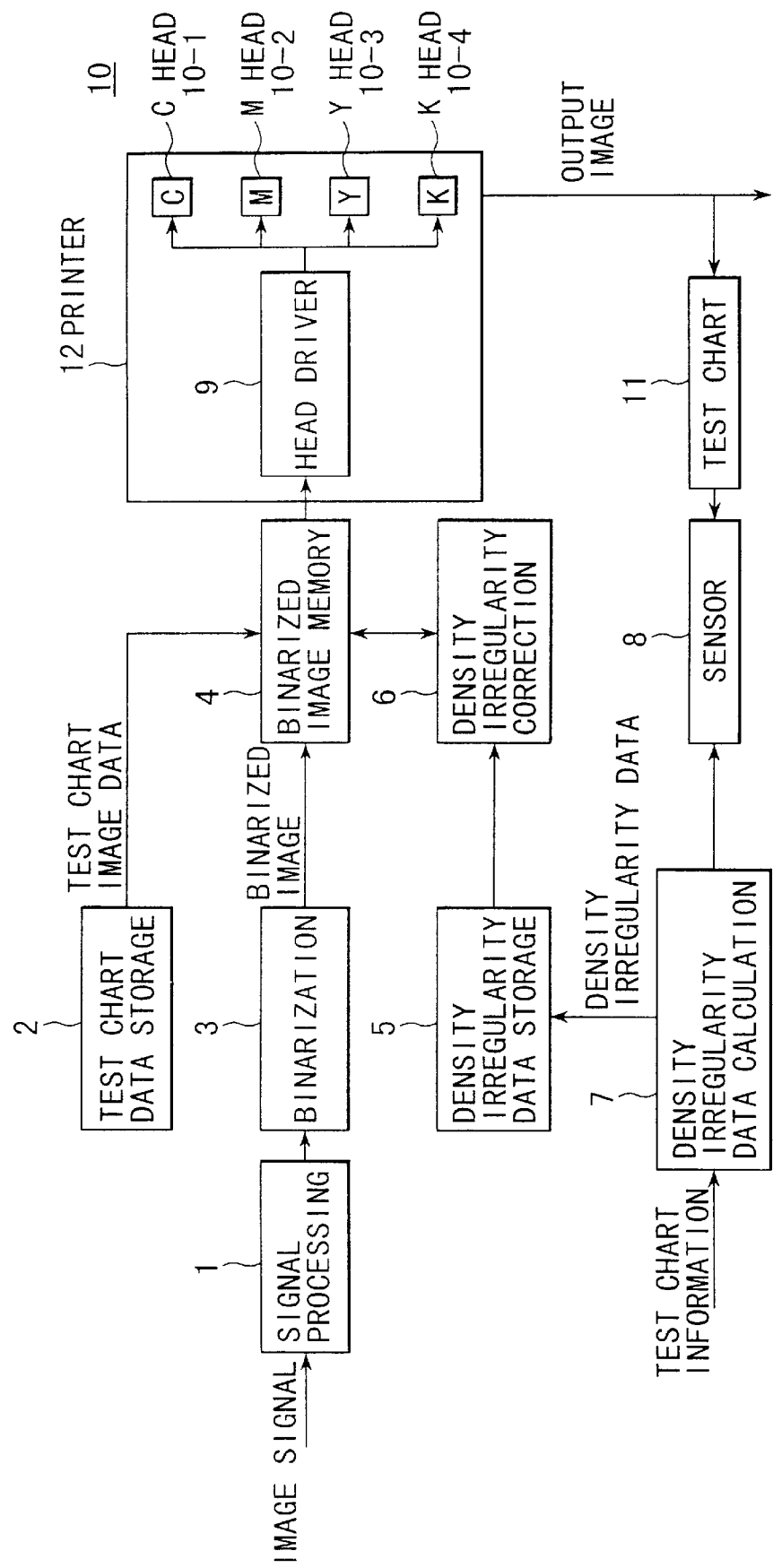
FIG. 1 is a conceptual diagram of density irregularity correction processing for binarized image data according to the present invention.

Hereinafter, the preferred embodiments of the present invention will be described with reference to the accompanying drawings. FIG. 1 is a conceptual diagram of irregularity correction processing for binarized image data in accordance with an embodiment of the present invention. A signal processing unit 1 is connected to receive an image signal in which each pixel is represented by multivalued data for each of colors: C (cyan), M (magenta), Y (yellow), and K (black). The signal processing unit performs image processing, such as color correction, on the input image signal and then converts it into an image signal of a reference format. A binarization unit 3 converts the multivalued data in the image signal of the reference format from the signal processing unit 1 into binarized image data adapted to on-off control of ink. The binarized image data are stored into a binarized image memory 4. The binarized image data in the image memory 4 are read into a density irregularity correction unit 6 where they are corrected in accordance with density irregularity data from a density irregularity data storage unit 5. Responsive to the corrected binarized image data, a head driver 9 of a printer 12 drives heads 10-1 to 10-4 corresponding to C, M, Y, and K for on-off control of ink for image formation.

Here, the density irregularity data stored for correction of irregularities in image density in the data storage unit 5 is calculated in a density irregularity data calculation unit 7 from test chart information and irregularities in the density of a test chart 11 detected by a detector 8 such as a scanner. The test chart 11 is obtained by feeding test chart image data prestored in a test chart data storage unit 2 into the binarized image memory 4 and driving the heads 10-1 to 10-4 in accordance with the test chart image information. The test chart image data in the binarized image memory 4 is output to the printer without being corrected; thus, irregularities in density resulting from the characteristics of the heads 10-1 to 10-4 will appear on the test chart 11. The test chart information entered into the density irregularity data calculation unit 7 is input data corresponding to sample density values for each of C, M, Y, and K colors in the test chart image data and has print setup information added as required.

According to the above-described embodiment, density irregularity correction is made on image data already subjected to binarization, thus allowing precise density irregularity correction to be made independently of binarization.

Figure 2:
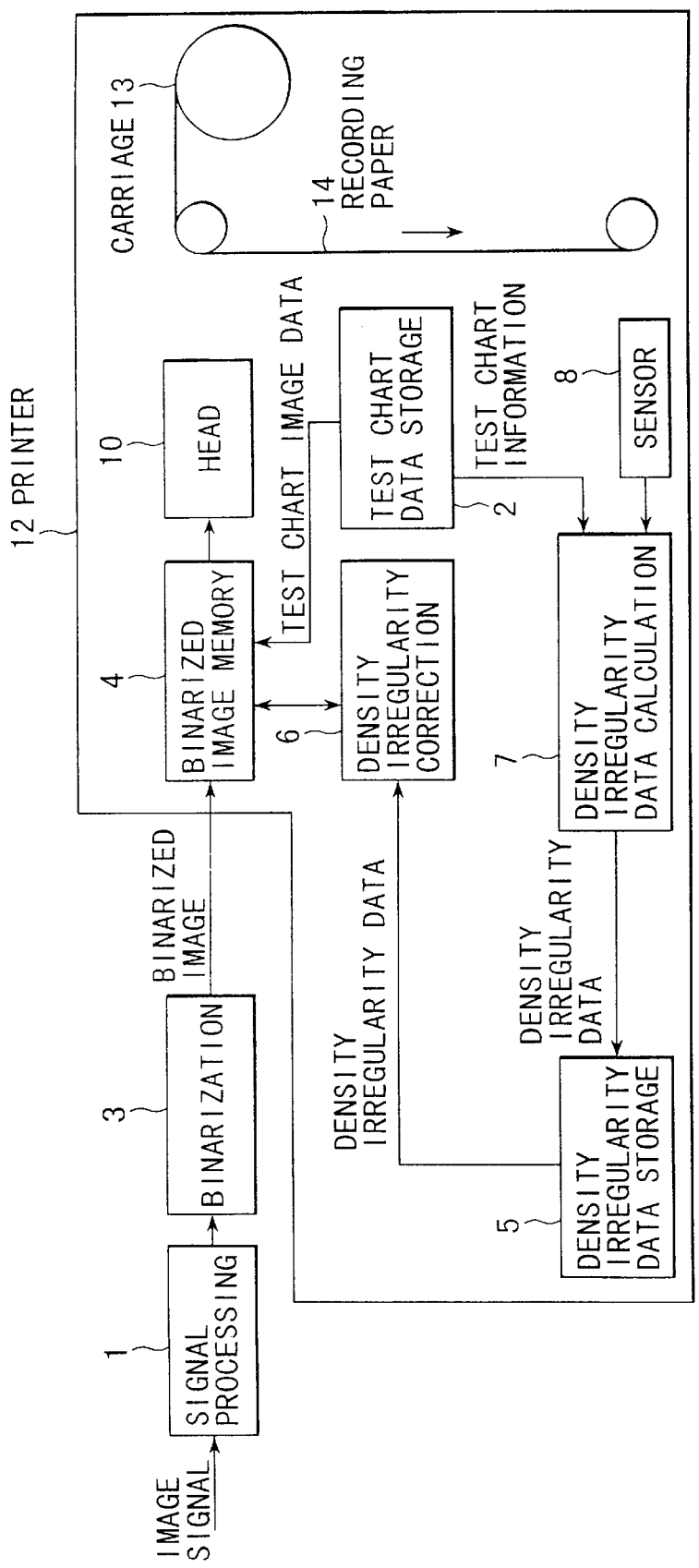
FIG. 2 shows an arrangement of density irregularity correction when it is made in a printer.

FIG. 2 shows an arrangement when the density irregularity correction is made within the printer. In FIG. 2, like reference numerals are used to denote corresponding components to those in FIG. 1. The arrangement of FIG. 2 differs from the arrangement of FIG. 1 in that other components than the signal processing unit 1, which performs signal processing, such as color correction, on an input image signal, and the binarization unit 3 are incorporated into the printer 12. In this case, a test chart is formed within the printer 12. Test chart image data prestored in the test chart data storage unit 2 is fed into the binarized image memory 4 and then drives the head 10 to make printing on recording paper 14 fed by a printer carriage 13. The test chart is detected by the recording paper 14 being fed along the surface of a sensor 8 by the printer carriage 13. In order to reduce the size of the printer 12, the sensor 8 may be placed in contact with the head 10. Alternatively, the sensor may be formed integral with the head.

As described above, since the density irregularity correction of binarized image data is made within the printer, a sequence of operations involved in density irregularity correction can be performed automatically within the printer. Such automatic correction allows near real-time correction to meet changing irregularities in image density.

Figure 3:
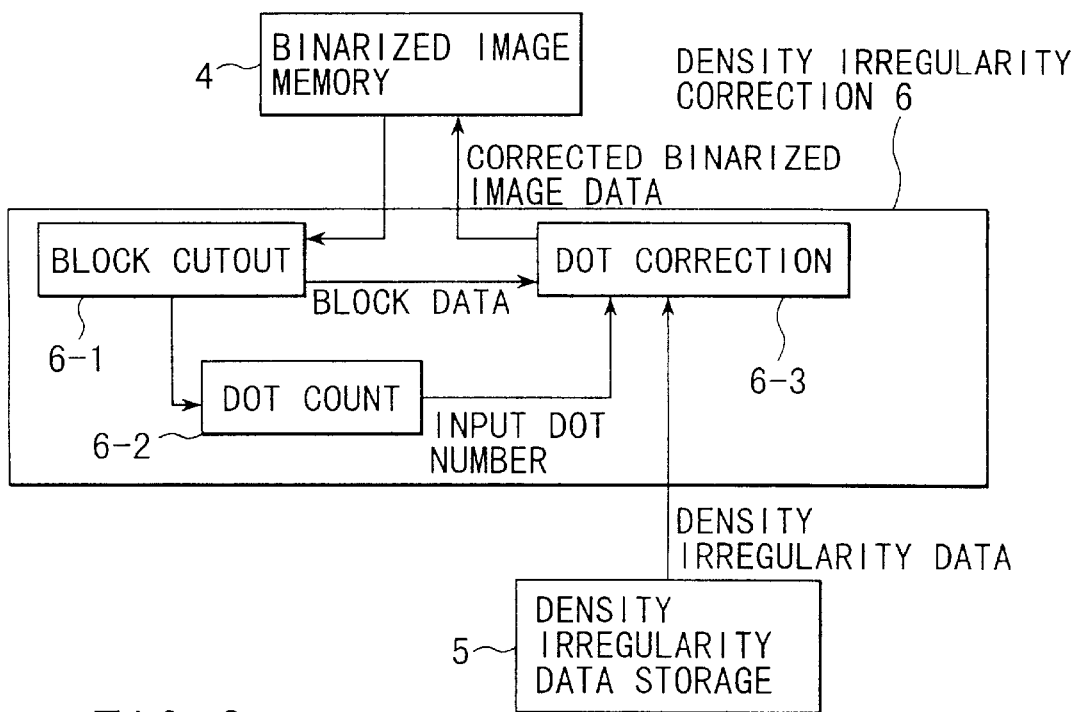
FIG. 3 shows an arrangement of the density irregularity correction section.

FIG. 3 is a block diagram of the density irregularity correction unit 6. As described previously, the density irregularity correction unit 6 rewrites the binarized image data in the binarized image memory 4 by binarized image data corrected by the density irregularity data stored in the density irregularity data storage unit 5. That is, a block cutout section 6-1 reads a block of binarized image data from the binarized image memory 4. A dot count section 6-2 counts the number of dots (ON dots) in the cut block which indicates ON of ink output and provides it as the number of input dots to a dot correction section 6-3, which, in turn, corrects the binarized image data in the cut block on the basis of the number of input dots and the density irregularity data read from the density irregularity data storage unit 5. After the correction, the binarized image data in the cut block in the binarized image memory 4 is rewritten by the binarized image data thus corrected. In this way, the binarized image data in the binarized image memory 4 is read on a block-by-block basis and then subjected to correction.

Figure 4:
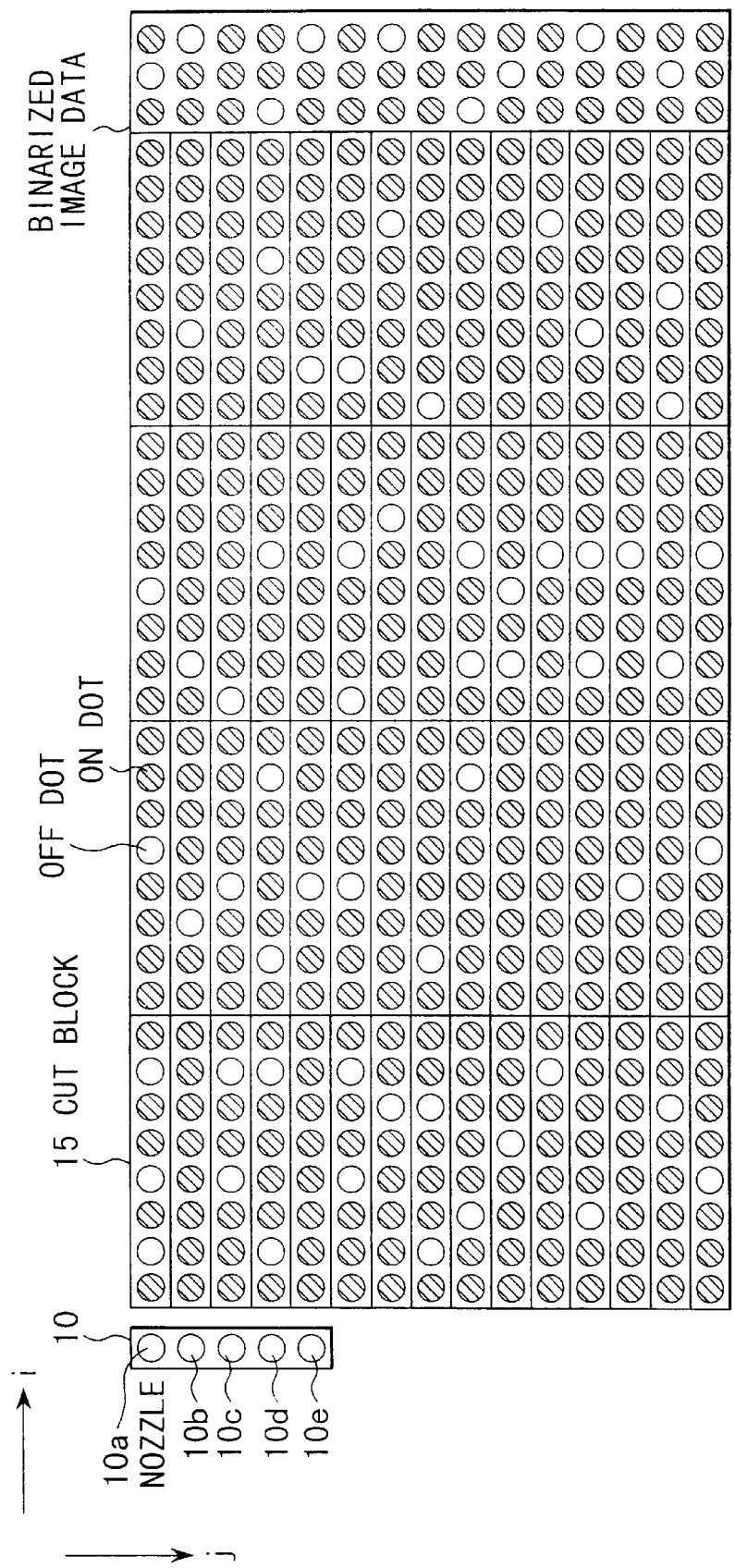
FIG. 4 shows a relationship among binarized image data, head position, and cut blocks.

FIG. 4 shows a relationship among binarized image data, head position, and cut blocks. When there is such a positional relationship as shown in FIG. 4 between the head 10 and the binarized image data, a cut block 15 is a region that contains a predetermined number of pixels in the direction perpendicular to the direction in which nozzles 10a to 10e constituting the head 10 are arranged. Here, the cut block is set to a length of eight pixels but may be set to an arbitrary length. The binarized image data correction processing is performed with each block read in sequence in the i direction. When the total number of pixels in the i direction is not an integral multiple of the predetermined number of pixels in each cut block, the last region having not the predetermined number of pixels is not subjected to correction. In FIG. 4, OFF dots represent dots that indicate the OFF of ink output and ON dots represent dots that indicate the ON of ink output. The ON dots are shown hatched.

Figure 5:
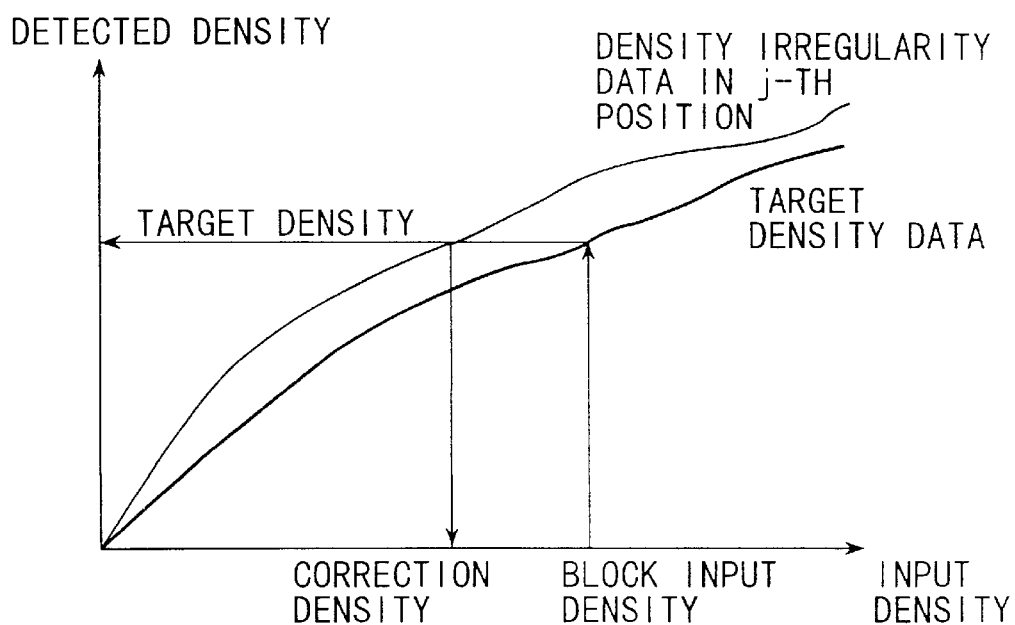
FIG. 5 is a diagram for use in explanation of a method of calculating the number of change dots using density irregularity data.

FIG. 5 illustrates the method of calculating the number of change dots using the density irregularity data. The density irregularity data used in the dot correction section 6-3 of the density irregularity correction unit 6 consists of data concerning the input density and the detected density value for each nozzle. The detected density value data is a signal value corresponding to the density detected by the sensor 8.

The density irregularity correction of a binarized image is made by changing the number of ON dots in each cut block. The number of changed dots is determined on the basis of the density irregularity data and the number of input dots in accordance with the following procedure. First, the block input density corresponding to the number of input dots is determined. A target density value for the block input density is determined from preset target density data. The target density data can be set arbitrarily. For example, the target density data for each block input density is set as the average of detected density values of all the nozzles for that block input density. Using density irregularity data for a cut block in the j-th position, an input density corresponding to the target density value is determined and then taken as a correction density. Assuming the number of dots corresponding to the block input density and the number of dots corresponding to the correction density to be the number of input dots and the number of corrected dots, respectively, the number of change dots becomes the number of corrected dots minus the number of input dots. If the number of change dots is positive, then some dots are added. If, on the other hand, the number of change dots is negative, then some dots are deleted.

FIGS. 6A and 6B are conceptual diagrams illustrating density irregularity correction by changing the number of dots. The dot correction section 6-3 in the density irregularity correction unit 6 determines the number of change dots and then adds or deletes dots the number of which corresponds to the number of change dots in a cut block.

Even if the dot density (the number of dots) is the same for cut blocks, the detected density differs from block to block due to a difference in density among dots as shown in FIG. 6A. Although the number of ON dots in each of cut blocks corresponding to the nozzles 10a to 10e is seven, the dot density differ from block to block. The narrower the hatching, the higher the dot density is. The difference in density among dots produces irregularities in image density. As shown in FIG. 6B, the detected density values of the nozzles 10a to 10b can be made all the same target density value by increasing or reducing the number of ON dots in cut blocks corresponding to the nozzles. In the example of FIGS. 6A and 6B, the dots are reduced in number for the nozzles 10a and 10d because they produce high-density dots. For the nozzles 10c and 10e, on the other hand, the number of dots is increased because they produce dots low in density.

Figure 7:
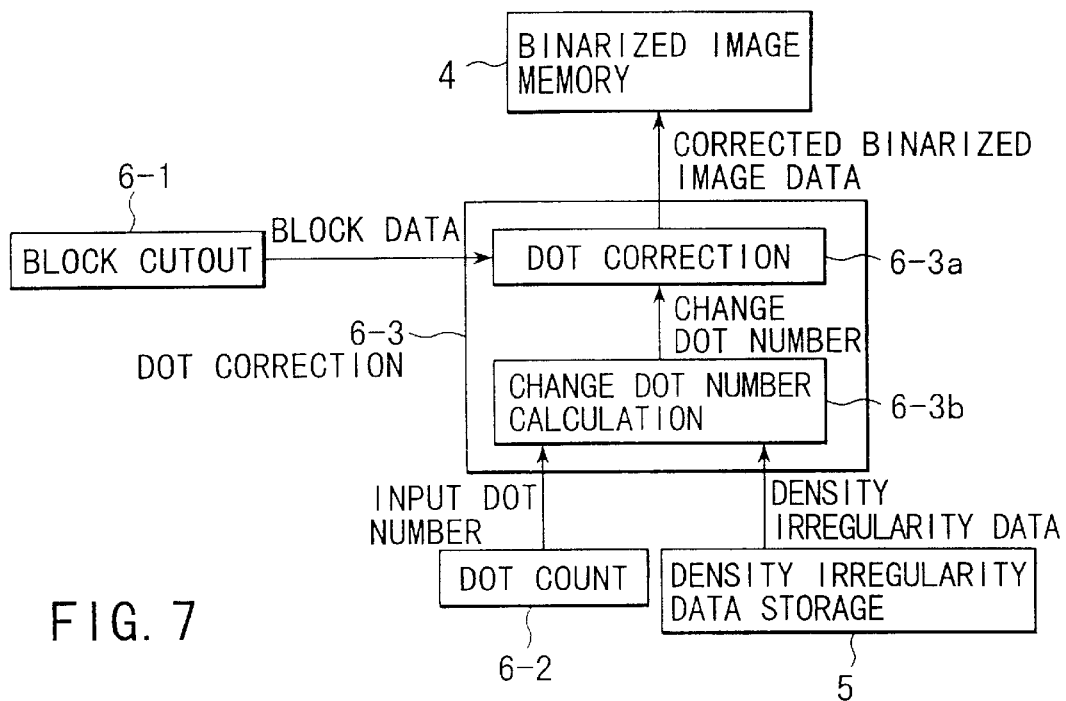
FIG. 7 shows an arrangement of the dot correction section shown in FIG. 3.

FIG. 7 shows an arrangement of the dot correction section 6-3, which comprises a dot change section 6-3a and a change dot number calculation section 6-3b. The change dot number calculation section 6-3b calculates the number of change dots in a block from the number of input dots entered from the dot count section 6-2 and the density irregularity data entered from the density irregularity data storage unit 5. The number of dots to be changed is calculated in accordance with the method illustrated in FIG. 5. The dot correction section 6-3a changes the arrangement of dots in block data from the block cutout section 6-1 by adding or deleting dots by the number specified by the change dot number calculation section 6-3b. The binarized image data having the number of dots changed is recorded into the binarized image memory 4 as corrected binarized image data.

Figure 8:
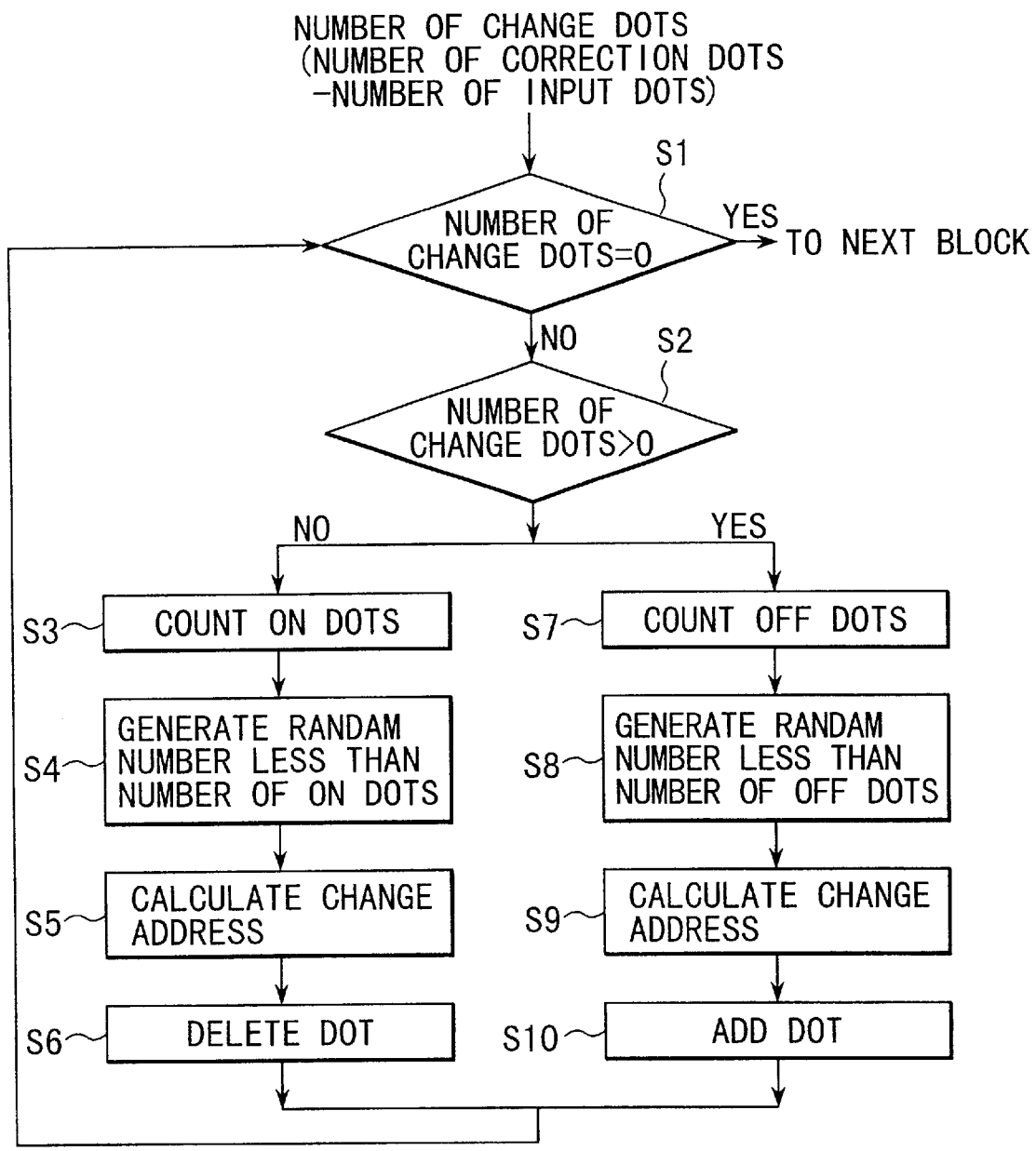
FIG. 8 shows a process flow in the dot change section.

FIG. 8 shows a process flow of the dot correction section 6-3a. First, a decision is made as to whether the number of change dots specified by the change dot number calculation section 6-3b is zero (step S1). If YES, the procedure goes to the next block processing without performing any processing. If the number of change dots is not zero, then the following processing is performed. First, a decision is made as to whether the number of change dots is greater than zero (step S2). If the number is negative, then the number of ON dots is counted (step S3) and then a random number lower than the number of ON dots is generated (step S4). A change dot address is next calculated based on the random number (step S5) and the dot in the calculated change dot address is deleted (step S6). If, on the other hand, the number of change dots is positive, then the number of OFF dots is counted (step S7) and then a random number lower than the number of OFF dots is generated (step S8). A change dot address is next calculated based on the random number (step S9) and a dot is added to the calculated address (step S10).

The above processing is repeated until the number of change dots reaches zero, whereupon the cut block data thus corrected is output to the binarized image memory 4 as corrected binarized image data. The procedure then goes to the next block processing.

Figure 9:
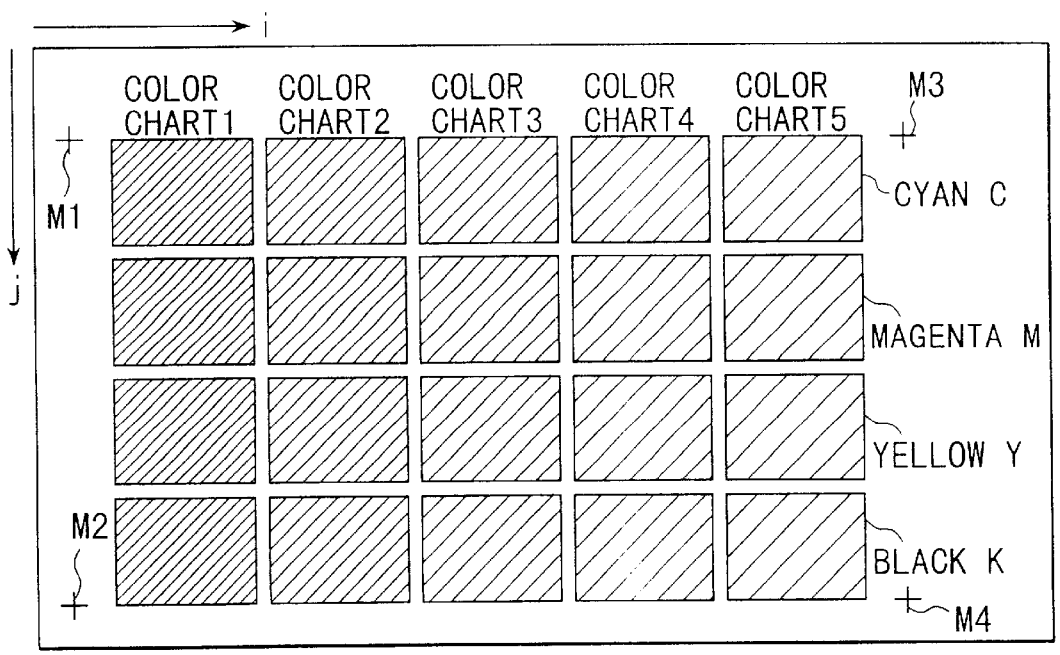
FIG. 9 shows an example of a test chart.

FIG. 9 shows an example of the test chart 11, which comprises color charts 1 to 5 representing five gradations of sample density for each of C, M, Y, and K. In the example shown, the narrower the hatching, the higher the density. The size of each color chart in the j direction is set larger than the head size. The test chart 11 is printed in given positions with cross markers M1 to M4. In detecting density irregularity, the correspondence between density irregularity data of each color chart and a coordinate position is determined by its position relative to the markers.

Figure 10:
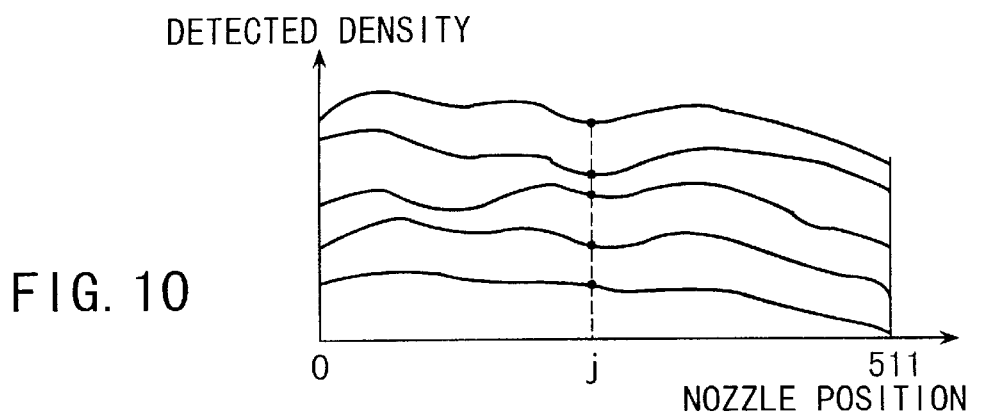
FIG. 10 is a diagram for use in explanation of a method of calculating the detecting density irregularity data in the detect section.

FIG. 10 is a diagram for use in explanation of a method of detecting density irregularity data. The sensor 8 captures image data of the test chart 11 and provides detected density value data in the position corresponding to each nozzle for each sample density of each color. The detected density value is the average of detected values with respect to the i direction in each color chart. FIG. 10 shows detected density irregularity data for five color charts for a certain color of the test chart with 512 nozzles used.

Figure 11:
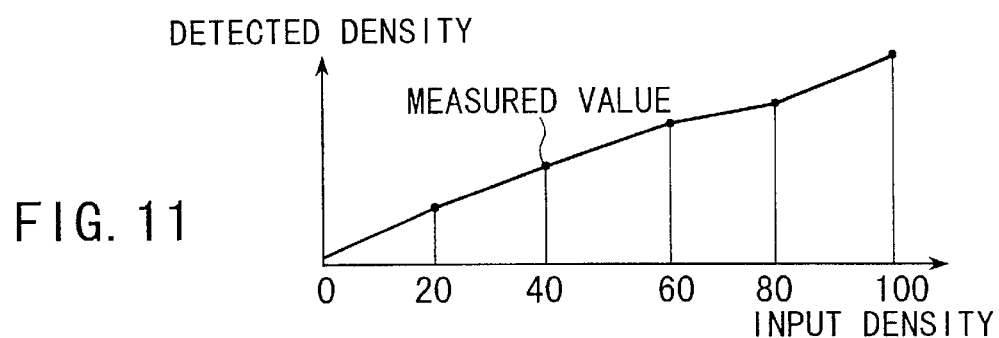
FIG. 11 is a diagram for use in explanation of a method of calculating the density irregularity data in the density irregularity data calculation section.

FIG. 11 is a diagram for use in explanation of a method of calculating the density irregularity data in the density irregularity data calculation unit 7. The density irregularity data calculation unit calculates density irregularity data in the, j-th nozzle position from the detected density irregularity data for each color shown in FIG. 10 and test chart information providing each sample density value. The density irregularity data provides a relation between input density and detected density for each color. As shown in FIG. 11, the density irregularity data in the j-th nozzle position is obtained by determining density values for all input density values through interpolation, using detected density data for the five sample input density values (20, 40, 60, 80, 100).

Figure 12A:
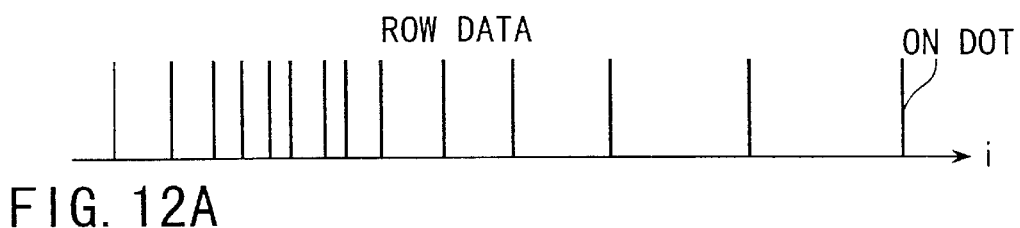
FIGS. 12A, 12B and 12C are diagrams for use in explanation of determination on adaptive correction region.
Figure 12B:
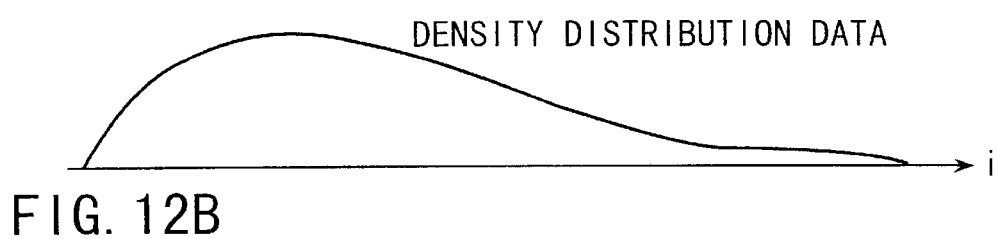
Figure 12C:
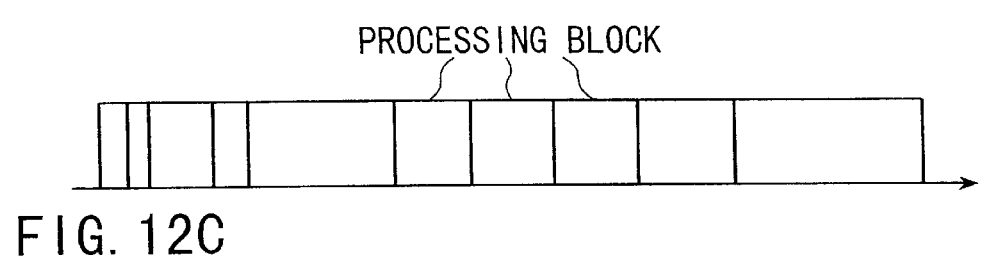

Next, determination on adaptive correction region will be described with reference to FIGS. 12A, 12B and 12C. So far, the size of each cut block has been fixed as shown in FIG. 4. However, when the block is large in size, appropriate correction may not be made if the image density changes greatly within a block. Thus, in the following processing, the block size is changed according to the image structure. Let a region considered to be approximately constant in image density value be a block. In order to obtain such a block, the following processing is performed on row data in a binarized image. First, an appropriate point spread function is convoluted with binary data as shown in FIG. 12A to obtain an approximate density distribution as shown in FIG. 12B. The row data is divided into regions each of which is considered approximately constant in density distribution. Of the resulting regions, regions larger than a given size are assumed to be processing blocks (FIG. 12C).

Figure 13:
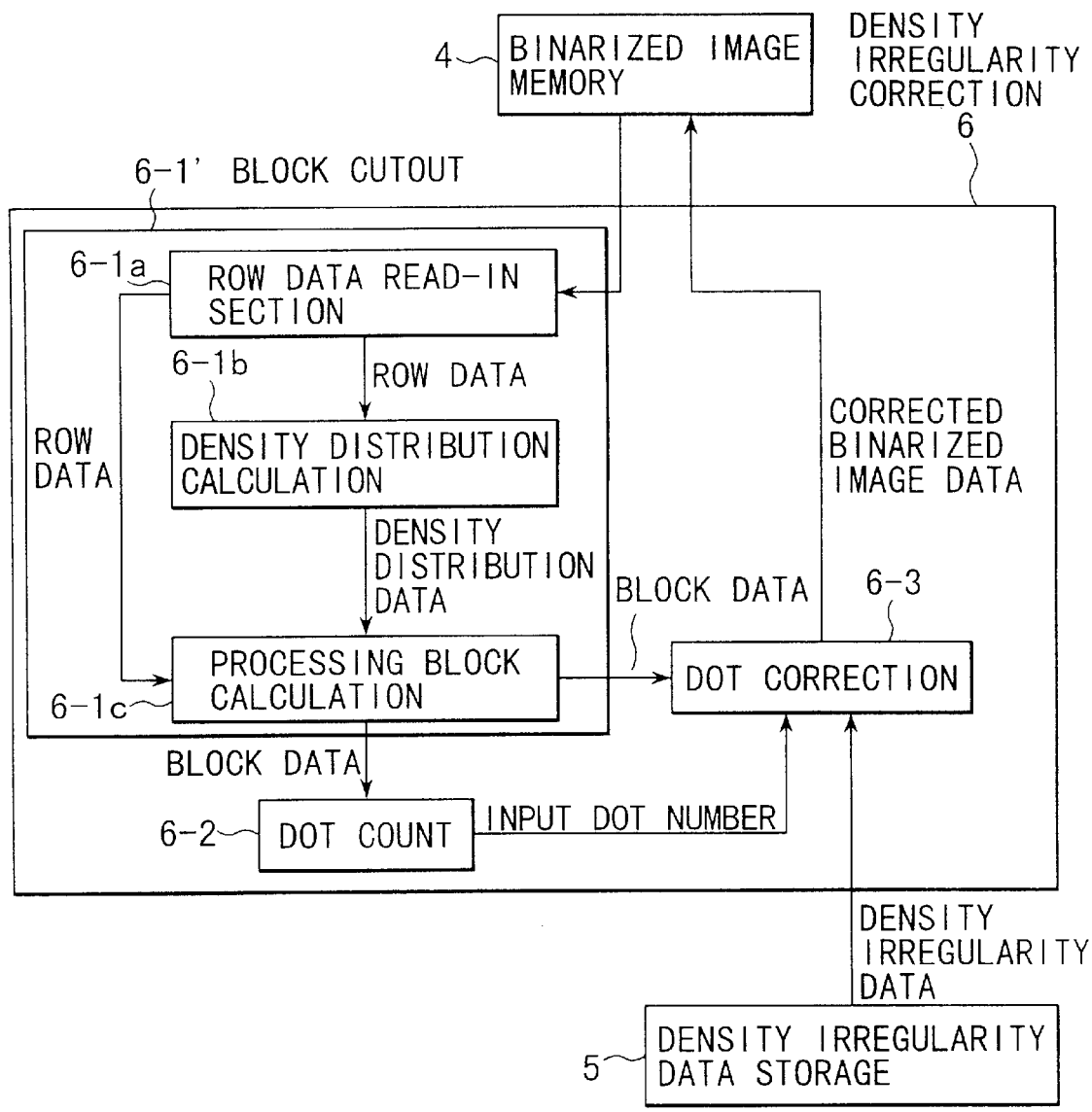
FIG. 13 shows an arrangement of the density irregularity correction section for making adaptive correction by setting blocks adaptively.

FIG. 13 shows an arrangement of the density irregularity correction unit for adaptive correction, which is different from FIG. 3 only in the function of the block cutout section. That is, block cutout section 6-1' reads row data for one row in binarized image data into a row data read section 6-1a. A density distribution calculation section 6-1b reads in the row data from the row data read section 6-1a and convolutes it with a point spread function to calculate approximate density distribution data. A processing block calculation section 6-1c receives the density distribution data and divides the density distribution data into regions each of which is considered to be constant in density value. The regions that are larger than a given size are considered as processing regions. Data in corresponding regions in the row data from the row data read section 6-1a is output as block data to a dot correction section 6-3 and a dot count section 6-2.

Figure 14A:
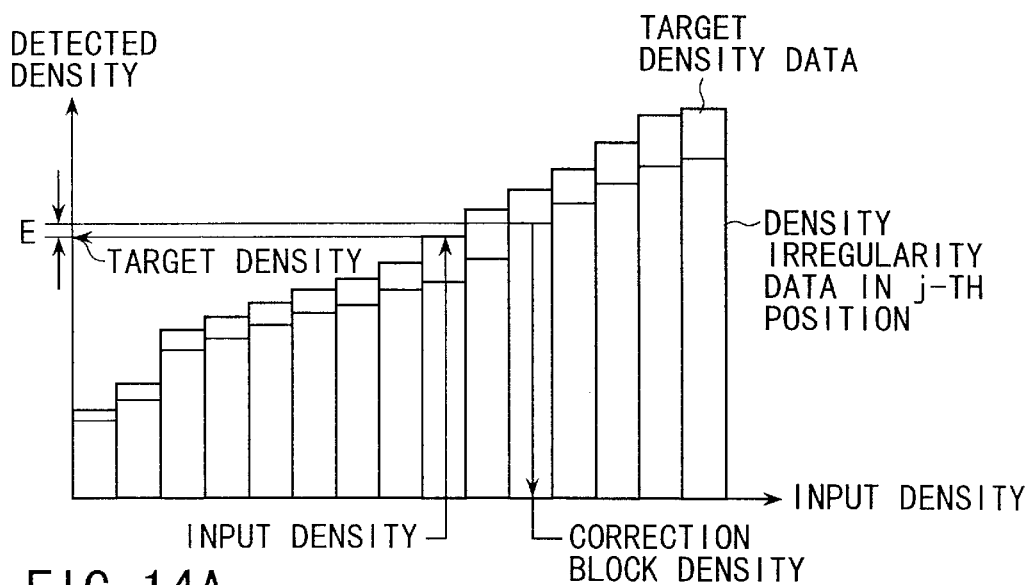
FIGS. 14A and 14B are diagrams for use in explanation of the calculation of the number of change dots and carry-over of correction errors.
Figure 14B:
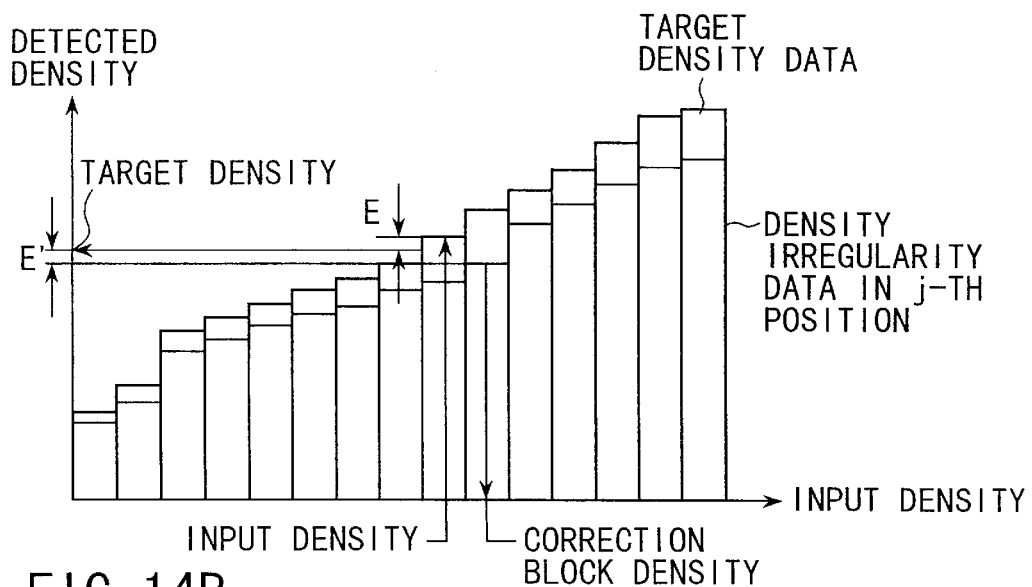

FIGS. 14A and 14B are diagrams for use in explanation of the calculation of the number of change dots and the carryover of correction errors. In FIG. 5, the input density and the detected density for the target density data and the density irregularity data in the j-th nozzle position have been related continuously. However, in practice the input density can be defined only in terms of the number of pixels in a block. Thus, when a cut block is small in size, changing of dots fails to make precise correction. Accordingly, a correction error is added to the target density of the next block to reduce the correction error in a wider range.

That is, as shown in FIG. 14A, a target density value corresponding to the block input density determined from the number of input dots in a block is determined from target density data. That input density corresponding to density irregularity data in the j-th nozzle position which provides a density value closest to the target density value is determined from the density irregularity data in the j-th nozzle position and taken as the correction block density. The correction error in the j-th nozzle position at the target density and the correction density is determined as E. When correction is made of the next block in the j-th nozzle position, a new target density value is produced by adding the correction error E obtained in the previous block to a target density value corresponding to an input density. In the example of FIGS. 14A and 14B, E is a negative value; thus, the target density value is the input density value minus E. An input density corresponding to the density irregularity data in the j-th nozzle position that provides a density value closest to the new target density value and taken as a correction block density. The subsequent blocks in the j-th position are corrected in the same manner. In the (j+1)st position, the same processing is started with E put as zero.

FIGS. 15A and 15B are diagrams for use in explanation of dot arrangement correction which is made taking into consideration the arrangement of surrounding dots. In the example of FIG. 8, the change address is generated randomly using a random number by the dot change section 6-3a. In this case, however, ON dots or OFF dots may be concentrated by chance through correction, which causes a degradation in image quality. To attain dot arrangement with less concentration, therefore, the position of correction is determined taking into consideration the arrangement of surrounding dots in adding or deleting dots. That is, the determination of dot correction position is made in such a way so as to make high the probability of, when a dot is added, a position where there are no dots before and after being selected as the position of correction and, when a dot is deleted, a position where there are dots before and after being selected as the position of correction. FIGS. 15A and 15B show examples of correction positions determined in the above manner. FIG. 15A shows an example where a dot is added, while FIG. 15B shows an example where a dot is deleted.

Figure 16:
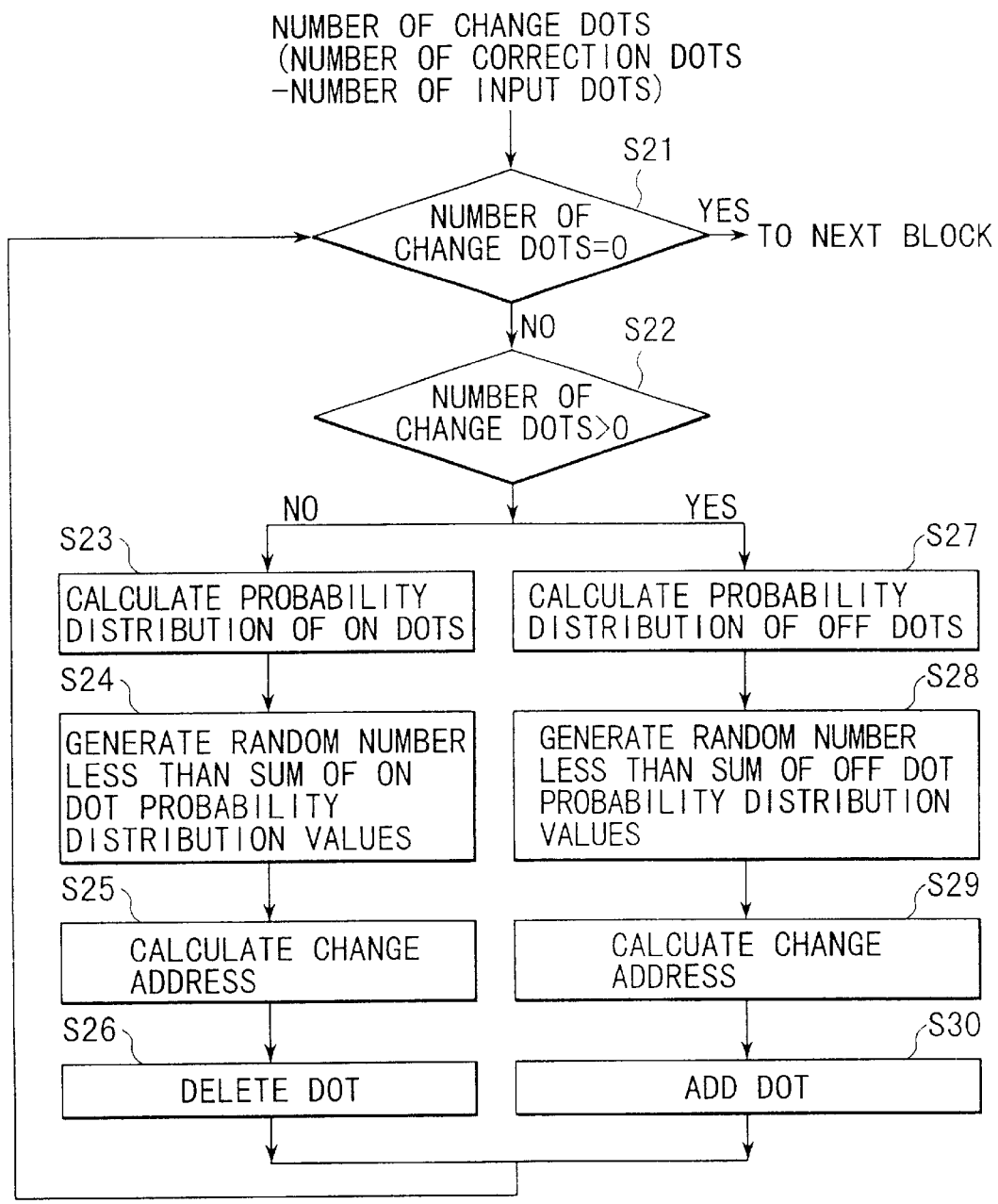
FIG. 16 shows a process flow in the dot change section that determines the position of correction taking the arrangement of surrounding dots into consideration.

FIG. 16 shows a process flow in the dot correction section 6-3 which determines the dot correction position taking the arrangement of surrounding dots into consideration. First, a decision is made in step S21 as to whether or not the number of change dots entered from the change dot number calculation section 6-3b is zero. If it is zero, the procedure goes to processing of the next block without performing any processing. If it is not zero, the following processing is performed. A decision is made in step S22 as to whether the number of change dots is positive or negative. If the number of change dots is negative, the probability distribution of ON dots is calculated (step S23). The probability distribution has a value of 0 for an OFF dot, 100 for an ON dot that is sandwiched between ON dots before and after, and 50 for an ON dot for which either of dots before and after is an ON dot but not both. A random number which is less than the sum of probability distribution values within a block is generated (step S24). An address allocated to that value is used as the address of a change dot and the dot in that address is deleted (steps S25 and S26). The number of values to be allocated is set to increase in proportion of the probability value.

On the other hand, if the number of change dots is positive in step S22, then the probability distribution of OFF dots is calculated (step S27). The probability distribution has a value of 0 for an ON dot, 100 for an OFF dot sandwiched between OFF dots before and after, and 50 for an OFF dot for which either of dots before and after is an OFF dot but not both. A random number which is less than the sum of probability distribution values within a block is generated (step S28). An address allocated to that value is used as the address of a change dot and the dot in that address is deleted (steps S29 and S30). The above processing is repeated until the number of change dots reaches zero.

Alternative methods to determine the position of dot correction with the arrangement of surrounding dots in mind will be described below. A first method is to rewrite block data by previously created corrected dot arrangement data. As shown in FIG. 17, after the number of dots after correction is determined (five in the drawing), dot arrangement data in the address corresponding to the number of dots after correction is selected from a correction mask table 100 and block data is rewritten by the corrected dot arrangement data in the table. The block data is thus corrected.

Figure 18:
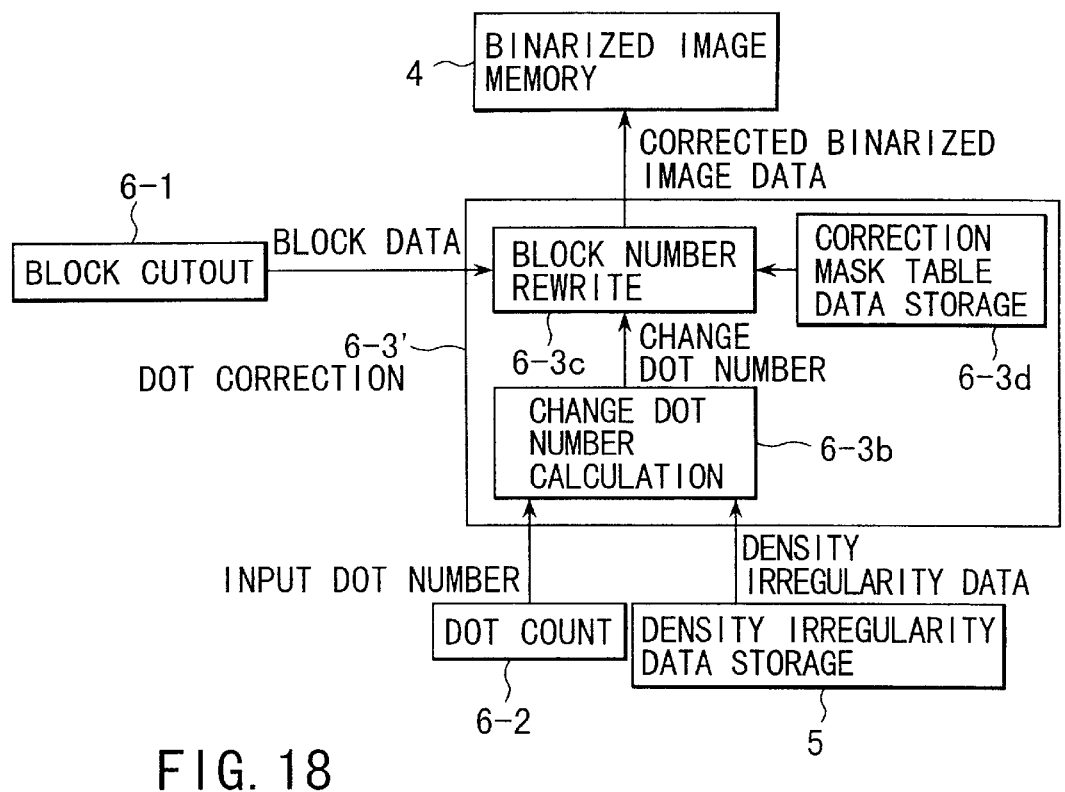
FIG. 18 shows an arrangement of the dot correction section for making correction based on the correction mask table.

FIG. 18 shows an arrangement of a dot correction section for making dot corrections based on the above correction mask table 100. In the dot correction section 6-3' for dot correction using correction masks, the dot change section 6-3a shown in FIG. 7 is replaced by a block number rewrite section 6-3c and a correction mask table data storage section 6-3d is added. In this case, the change dot number calculation section 6-3b sends the number of dots after change to the block number rewrite section 6-3c, which, in turn, rewrites block data from the block cutout section 6-1 by correction mask table data read from the table data storage section 6-3d in accordance with the number of change dots after correction. The binarized image data thus rewritten is stored into the binarized image memory 4 as corrected binarized image data.

Figure 19:
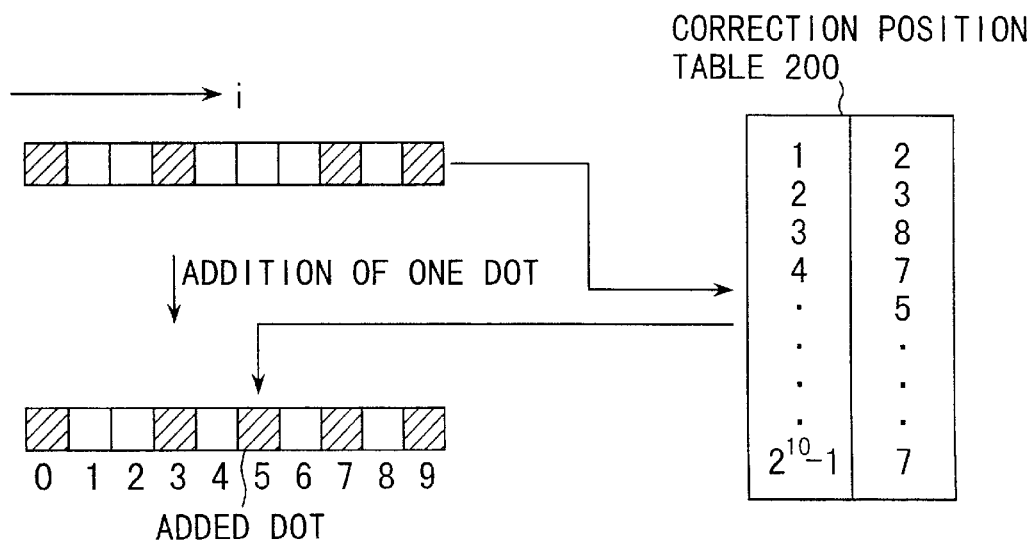
FIG. 19 is a diagram for use in explanation of a dot correction method using a correction position table.

Next, a second method to determine the position of dot correction with the arrangement of surrounding dots in mind will be described. Here, to rewrite block data, the position of dot correction is determined in accordance with correction position data that has been preset according to the dot arrangement in the block data. That is, as shown in FIG. 19, reference is made to a correction position table 200 having correction position data corresponding to all the dot positions in correction blocks to determine the dot correction position (the fifth position in the drawing) and dot correction is made in that correction position. The correction position table 200 has different data for dot addition and dot deletion. In the example of FIG. 19, since the block size is 10, the table has $2^{10}-1$ pieces of data as a combination of correctable dot arrangements for each of dot addition and dot deletion.

Figure 20:
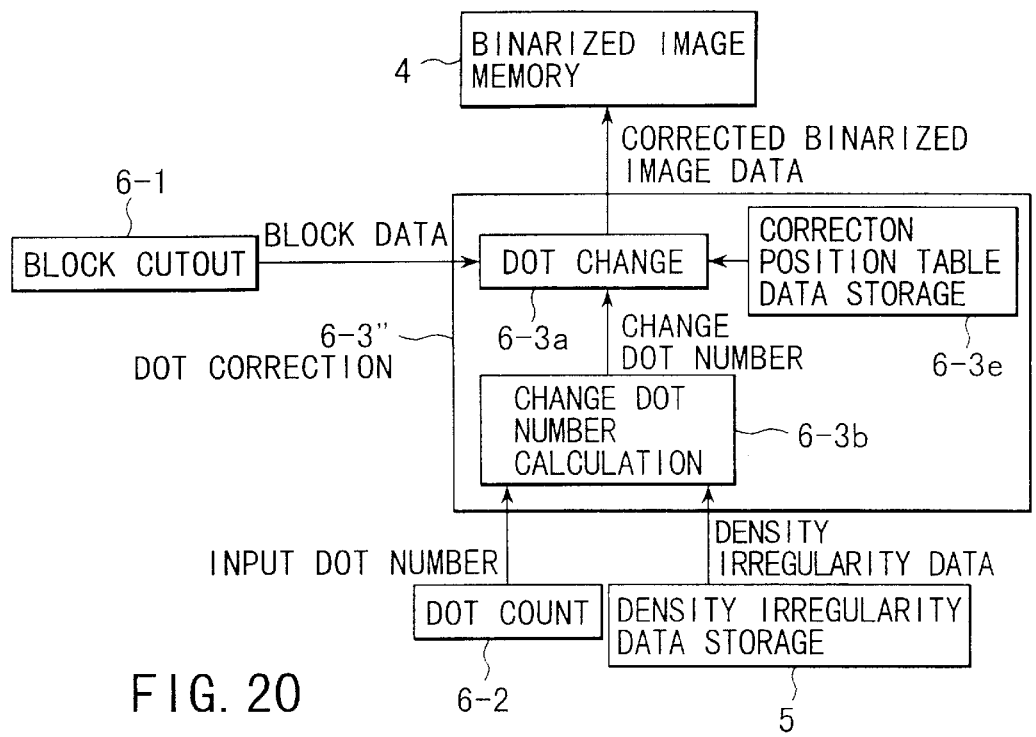
FIG. 20 shows an arrangement of the dot correction section for making correction based on the correction position table.

FIG. 20 shows an arrangement of a dot correction section for making corrections based on the above correction position table 200.

The dot correction section 6-3″ using the correction position table 200 is arranged such that a correction position table storage section 6-3e is added to the dot change section 6-3a. The dot change section 6-3a retrieves correction position data from the correction position table storage section 6-3e on the basis of the dot arrangement in input block data from the block cutout section 6-1 and the sign of the number of change dots from the change dot number calculation section 6-3e and then changes the dot arrangement in the block. The block data thus corrected is stored as corrected binarized image data into the binarized image memory 4.

Figure 21:
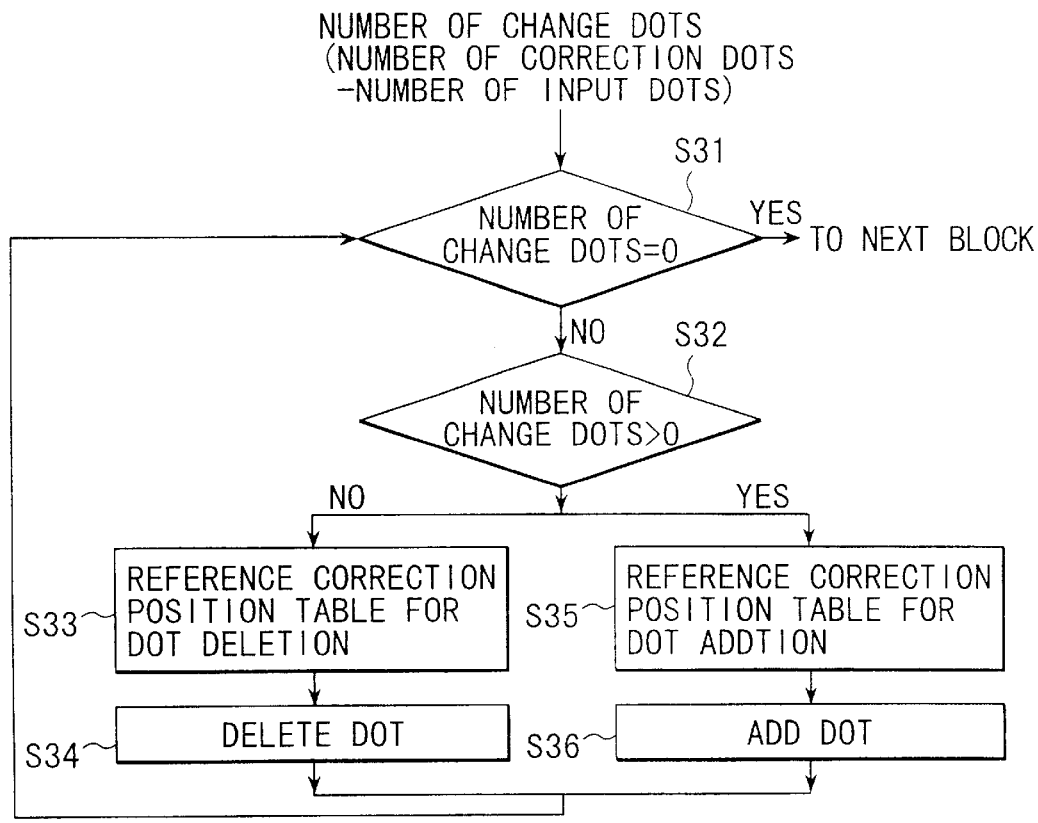
FIG. 21 shows a process flow in the dot change section using the correction position table.

FIG. 21 shows a process flow in the dot change section using the above correction position table 200. First, a decision is made in step S31 as to whether or not the number of change dots entered from the change dot number calculation section 6-3b is zero. If it is zero, the procedure goes to processing of the next block without performing any processing. If it is not zero, the following processing is performed. A decision is made in step S32 as to whether the number of change dots is positive or negative. If the number of change dots is negative, then reference is made to the correction position table for dot deletion to determine the dot deletion position (step S33) and the dot in that position is deleted (step S34).

If, on the other hand, the number of change dots is positive in step S32, then reference is made to the correction position table for dot addition to determine the position where a dot is to be added (step S35) and then a dot is added to that position (step S35). The above dot addition/deletion processing is repeated until the number of change dots reaches zero.

The present invention provides the following advantages:

(1) Since density irregularity correction is made for image data already subjected to binarization, the correction does not depend on the binarization processing. In addition, since density expansion caused by binarization processing is eliminated, the density irregularity correction can be made more precisely.

(2) Since the density irregularity correction is made inside the apparatus, the density irregularity correction can be automated. The automation allows correction to be made almost in real time to match changes in density irregularity characteristics.

(3) Since correction error is carried over, errors in the density irregularity correction which arise from incomplete correction in local regions can be prevented from being accumulated, which improves correction precision in wider regions.

(4) Since a dot arrangement method is adopted which allows for the arrangement of surrounding dots, dots are less easily concentrated by the density irregularity correction, reducing a degradation in image quality due to correction.

(5) Since a correction mask or correction position table is used in the dot arrangement method that allows for the arrangement of surrounding dots, the calculation time required for the processing in (4) can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image formation apparatus comprising:
a recording head having a plurality of recording elements for recording an image on a recording medium;
binarized image data storage unit for storing binarized image data for on-off control of the recording elements of the recording head;
correction data storage unit for storing density irregularity correction data for correcting irregularities in density which occur when the recording elements of the recording head are respectively driven to form the image, the density irregularity correction data being stored in correspondence with each of the recording elements; and
density irregularity correction unit for, prior to the image formation, correcting the binarized image data stored in the binarized image data storage unit on the basis of the density irregularity correction data stored in the correction data storage unit;
wherein the density irregularity correction unit reads binarized image data in a predetermined block from the binarized image data storage unit as dot data, calculates the number of dot data in the predetermined block that indicates the ON drive of each recording element, and changes the calculated value of dot data on the basis of the density irregularity correction data read from the correction data storage unit.

2. The image formation apparatus according to claim 1, wherein the size of the predetermined block can be changed according to the structure of input binarized image data.

3. The image formation apparatus according to claim 1, wherein the density irregularity correction unit calculates a correction density for binarized image data in a subsequent block, taking into consideration an input density determined from the calculated value of the dot data, and an error obtained when a correction density for binarized density is calculated in a given block based on a target density.

4. The image formation apparatus according to claim 1, wherein the density irregularity correction unit determines the position of dot to be corrected taking the arrangement of surrounding dots in the block into consideration.

5. The image formation apparatus according to claim 4, wherein the density irregularity correction unit, as the method of making corrections taking into consideration the arrangement of surrounding dots, rewrites binarized image data in a block by dot arrangement data corresponding to the number of change dots selected from a table consisting of previously created dot arrangement data.

6. The image formation apparatus according to claim 4, wherein the density irregularity correction unit, as the method of making corrections taking into consideration the arrangement of surrounding dots, references a table consisting of correction position data corresponding to the dot positions in all the correction blocks so as to determine the position of dots to be corrected and rewrites binarized image data in a block.

7. An image formation apparatus comprising:
a recording head having a plurality of recording elements for recording an image on a recording medium;

binarized image data storage unit for storing binarized image data for on-off control of the recording elements of the recording head;

correction data storage unit for storing density irregularity correction data for correcting irregularities in density which occur when the recording elements of the recording head are respectively driven to form the image, the density irregularity correction data being stored in correspondence with each of the recording elements;

density irregularity correction unit for, prior to the image formation, correcting the binarized image data stored in the binarized image data storage unit on the basis of the density irregularity correction data stored in the correction data storage unit; and testing binarized image data storage unit for storing binarized image data for testing purpose and detecting unit for detecting irregularities in density of a test image formed by driving the recording head with the binarized image data stored in the testing binarized image storage unit, the density irregularity correction data being calculated on the basis of the detected irregularities in density.

8. The image formation apparatus according to claim 7, wherein the recording head, the binarized image data storage unit, the correction data storage unit, the density irregularity correction unit, the testing binarized image data storage unit, and the detecting unit are provided within the apparatus, and input binarized image data is subjected to density irregularity correction within the apparatus.

9. The image formation apparatus according to claim 8, wherein the recording head and the detecting unit are placed in proximity to each other or formed integral with each other.

* * * * *

UNITED STATES PATENT AND TRADEMARK OFFICE
CERTIFICATE OF CORRECTION

PATENT NO. : 6,707,579 B1 Page 1 of 1
DATED : March 16, 2004
INVENTOR(S) : Yasuhiro Komiya It is certified that error appears in the above-identified patent and that said Letters Patent is hereby corrected as shown below:

Title page,
Item [75], Inventors, replace "Machioji (JP)" with -- Hachioji (JP) --

Signed and Sealed this

Tenth Day of August, 2004

JON W. DUDAS
*Acting Director of the United States Patent and Trademark Office*